(12) United States Patent
Tsunozaki et al.

(10) Patent No.: US 9,306,213 B2
(45) Date of Patent: Apr. 5, 2016

(54) PROCESS FOR PRODUCING CATHODE ACTIVE MATERIAL FOR LITHIUM ION SECONDARY BATTERY

(71) Applicant: ASAHI GLASS COMPANY, LIMITED, Chiyoda-ku (JP)

(72) Inventors: Kentaro Tsunozaki, Tokyo (JP); Haisheng Zeng, Tokyo (JP); Takeshi Kawasato, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 86 days.

(21) Appl. No.: 14/139,952

(22) Filed: Dec. 24, 2013

(65) Prior Publication Data

US 2014/0113193 A1 Apr. 24, 2014

Related U.S. Application Data

(63) Continuation of application No. PCT/JP2012/066063, filed on Jun. 22, 2012.

(30) Foreign Application Priority Data

Jun. 24, 2011 (JP) .................. 2011-140493

(51) Int. Cl.
| | |
|---|---|
| H01M 4/36 | (2006.01) |
| H01M 4/485 | (2010.01) |
| H01M 4/58 | (2010.01) |
| C01G 53/00 | (2006.01) |
| H01M 10/052 | (2010.01) |

(52) U.S. Cl.
CPC .............. *H01M 4/364* (2013.01); *C01G 53/50* (2013.01); *H01M 4/485* (2013.01); *H01M 4/5825* (2013.01); *H01M 10/052* (2013.01); *C01P 2002/72* (2013.01); *C01P 2002/76* (2013.01); *C01P 2004/61* (2013.01); *C01P 2004/80* (2013.01); *C01P 2006/12* (2013.01); *C01P 2006/19* (2013.01); *Y02E 60/122* (2013.01)

(58) Field of Classification Search
CPC ...... C01G 53/50; H01M 4/364; H01M 4/485; H01M 4/5825; H01M 10/052; Y02E 60/122; C01P 2002/72; C01P 2002/76; C01P 2004/61; C01P 2004/80; C01P 2006/12; C01P 2006/19
See application file for complete search history.

(56) References Cited

U.S. PATENT DOCUMENTS

| | | | | |
|---|---|---|---|---|
| 2009/0087362 | A1* | 4/2009 | Sun et al. ................. | 423/179.5 |
| 2011/0008660 | A1* | 1/2011 | Marple et al. ............. | 429/94 |
| 2011/0033749 | A1* | 2/2011 | Uchida et al. ............ | 429/223 |
| 2011/0262811 | A1* | 10/2011 | Kinoshita ............ | H01M 4/131 |
| | | | | 429/217 |
| 2013/0236788 | A1 | 9/2013 | Tsunozaki et al. | |
| 2013/0318780 | A1 | 12/2013 | Tsunozaki et al. | |

FOREIGN PATENT DOCUMENTS

| | | |
|---|---|---|
| CN | 101223660 A | 7/2008 |
| JP | 2003-7299 | 1/2003 |
| JP | 2005-268017 | 9/2005 |
| JP | 2006-127932 | 5/2006 |
| JP | 2008-506244 | 2/2008 |
| JP | 2008-536285 | 9/2008 |
| JP | 2010-86922 | 4/2010 |
| JP | 4582990 | 9/2010 |
| WO | 2006/123572 | 11/2006 |
| WO | 2007/102407 | 9/2007 |
| WO | 2009/157524 | 12/2009 |

OTHER PUBLICATIONS

International Search Report issued Sep. 11, 2012 in PCT/JP2012/066063 filed Jun. 22, 2012.
U.S. Appl. No. 14/139,969, filed Dec. 24, 2013, Tsunozaki, et al.
U.S. Appl. No. 14/140,059, filed Dec. 24, 2013, Murotani, et al.
U.S. Appl. No. 14/691,818, filed Apr. 21, 2015, Kawasato, et al.
U.S. Appl. No. 14/694,342, filed Apr. 23, 2015, Hardiyanto, et al.

* cited by examiner

*Primary Examiner* — Muhammad Siddiquee
(74) *Attorney, Agent, or Firm* — Oblon, McClelland, Maier & Neustadt, L.L.P.

(57) ABSTRACT

To provide a process for producing a cathode active material for a lithium ion secondary battery, a cathode for a lithium ion secondary battery, and a lithium ion secondary battery.
A production process which comprises contacting a lithium-containing composite oxide containing Li element and a transition metal element with a composition (1) {an aqueous solution containing cation M having at least one metal element (m)} and a composition (2) {an aqueous solution containing anion N having at least one element (n) selected from the group consisting of S, P, F and B, forming a hardly soluble salt when reacted with the cation M}, wherein the total amount A (mL/100 g) of the composition (1) and the composition (2) contacted per 100 g of the lithium-containing composite oxide is in a ratio of 0.1<A/B<5 based on the oil absorption B (mL/100 g) of the lithium-containing composite oxide.

12 Claims, 1 Drawing Sheet

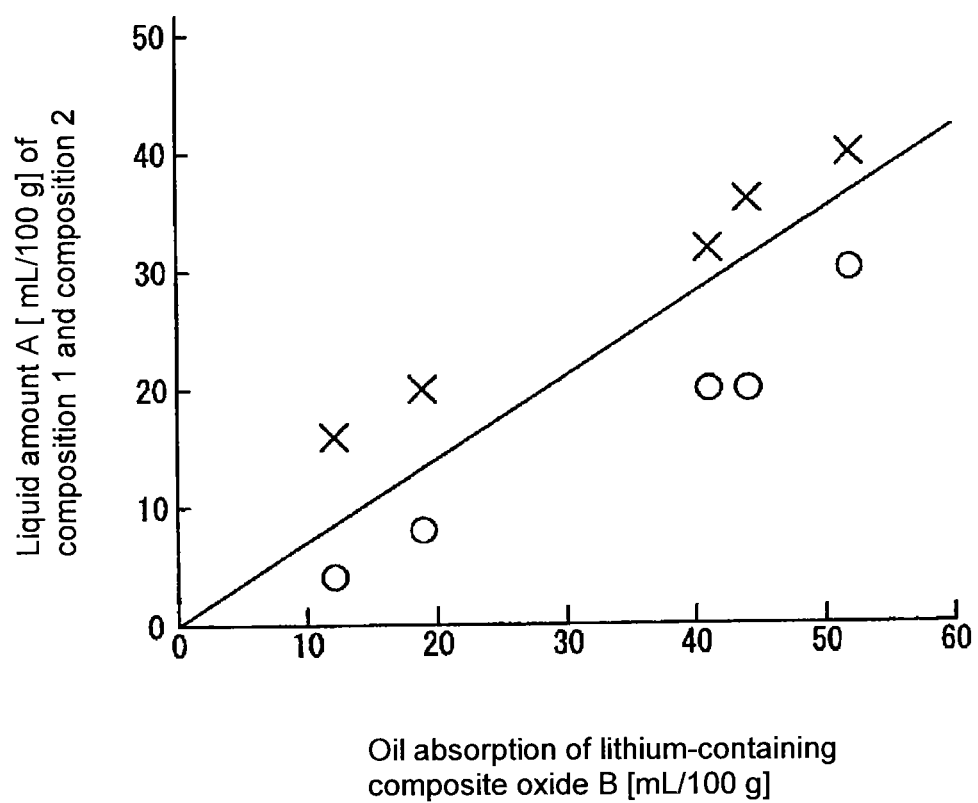

PROCESS FOR PRODUCING CATHODE ACTIVE MATERIAL FOR LITHIUM ION SECONDARY BATTERY

TECHNICAL FIELD

The present invention relates to a process for producing a cathode active material for a lithium ion secondary battery. The present invention further relates to a cathode for a lithium ion secondary battery using a cathode active material for a lithium ion secondary battery obtained by the production process, and a lithium ion secondary battery.

BACKGROUND ART

Lithium ion secondary batteries are widely used for portable electronic instruments such as mobile phones or notebook-size personal computers. As a cathode active material for a lithium ion secondary battery, a composite oxide of lithium with a transition metal, etc. (hereinafter sometimes referred to as lithium-containing composite oxide) such as $LiCoO_2$, $LiNiO_2$, $LiNi_{0.8}Co_{0.2}O_2$ or $LiMn_2O_4$, is employed.

Further, in recent years, it is desired to further reduce the size and weight as a lithium ion secondary battery for portable electronic instruments or vehicles, and a further improvement in the discharge capacity per unit mass and in the characteristics such that the discharge capacity will not be decreased after charge and discharge cycles are repeatedly carried out (hereinafter sometimes referred to as cycle characteristic), is desired. Further, particularly for vehicles, a further improvement in the characteristics such that the discharge capacity will not be decreased after discharged at a high discharge rate (hereinafter sometimes referred to as rate characteristics), is desired. To improve the cycle characteristics and the rate characteristics, it has been known to be effective to form a covering layer on a lithium-containing composite oxide.

Patent Document 1 discloses a process of dispersing a lithium-containing composite oxide in an aluminum nitrate aqueous solution, adding an ammonium fluoride aqueous solution thereto, followed by filtration, washing and heating to form a covering layer of aluminum fluoride on the surface of the lithium-containing composite oxide. However, by this process, both of filtration and washing are carried out, whereby the process is complicated and in addition, a waste disposal treatment is necessary, and thus the process is inferior in the productivity. Further, when the wet cake obtainable after filtration is dried, the cathode active material tends to be agglomerated to form coarse particles.

Patent Document 2 discloses a method of forming a surface treated layer containing an $AlPO_k$ compound by dispersing 20 g of a lithium-containing composite oxide to 100 mL of an aqueous dispersion having an amorphous $AlPO_k$ phase dispersed in a colloidal form, followed by drying at 130° C. and further by heat treatment. However, by this method, a large quantity of energy is required to dry a large amount of water, and at same time, the cathode active material is likely to be agglomerated to form coarse particles in the same manner as above, at the time of drying.

Patent Document 3 discloses a process of stirring and mixing an aqueous solution containing zirconium and a lithium-containing composite oxide represented by the formula $Li_pN_xM_yO_zF_a$ ($0.9 \leq p \leq 1.1$, $0.965 \leq x < 1.00$, $0 < y \leq 0.035$, $1.9 \leq z \leq 2.1$, $x+y=1$ and $0 \leq a \leq 0.02$) wherein the molar amount of Li element is from 0.9 to 1.1 molar times the total molar amount of the transition metal element, and firing the mixture at high temperature of at least 450° C. in an oxygen atmosphere to obtain a cathode active material having the surface layer of the lithium-containing composite oxide covered with zirconium oxide. By this method, it is difficult to cover the lithium-containing composite oxide with a compound other than an oxide.

PRIOR ART DOCUMENTS

Patent Documents

Patent Document 1: JP-A-2008-536285
Patent Document 2: Japanese Patent No. 4582990
Patent Document 3: WO2007/102407

DISCLOSURE OF INVENTION

Technical Problem

The present invention provides a process for producing a cathode active material for a lithium ion secondary battery by which a cathode active material excellent in the cycle characteristics and the rate characteristics even when discharging is carried out at a high voltage, can be obtained, a cathode for a lithium ion secondary battery using a cathode active material for a lithium ion secondary battery, and a lithium ion secondary battery.

Solution to Problem

The present invention provides the following.
[1] A process for producing a cathode active material for a lithium ion secondary battery, which comprises contacting a lithium-containing composite oxide containing Li element and a transition metal element with the following composition (1) and composition (2), and heating them, wherein
the total amount A (ml/100 g) of composition (1) and composition (2) contacted per 100 g of the lithium-containing composite oxide is in the ratio of $0.1<A/B<5$ based on the oil absorption B (ml/100 g) of the lithium-containing composite oxide:
composition (1): an aqueous solution containing cation M having at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, In, Sn, Sb, Bi, La, Ce, Pr, Nd, Gd, Dy, Er and Yb;
composition (2): an aqueous solution containing anion N having at least one element (n) selected from the group consisting of S, P, F and B, forming a hardly soluble salt when reacted with the cation M.
[2] The process for producing a cathode active material for a lithium ion secondary battery according to [1], wherein the metal element (m) contained in the composition (1) is Al.
[3] The process for producing a cathode active material for a lithium ion secondary battery according to [1] or [2], wherein the anion N contained in the composition (2) is at least one anion selected from the group consisting of $SO_4^{2-}$, $PO_4^{3-}$ and $F^-$.
[4] The process for producing a cathode active material for a lithium ion secondary battery according to any one of [1] to [3], wherein heating is carried out at from 250 to 700° C.
[5] The process for producing a cathode active material for a lithium ion secondary battery according to any one of [1] to [4], wherein the amount (molar ratio) of the metal element (m) contained in the composition (1) is within a range of from 0.001 to 0.05 based on the total amount of the transition metal element contained in the lithium-containing composite oxide.
[6] The process for producing a cathode active material for a lithium ion secondary battery according to any one of [1] to

[4], wherein the amount (molar ratio) of the anion N contained in the composition (2) is within a range of from 0.001 to 0.05 based on the total amount of the transition metal element contained in the lithium-containing composite oxide.

[7] The process for producing a cathode active material for a lithium ion secondary battery according to any one of [1] to [6], wherein contact of the lithium-containing composite oxide with the composition (1) or the composition (2) is carried out by adding the composition (1) or the composition (2) to the lithium-containing composite oxide with stirring and mixing the lithium-containing composite oxide and the composition (1) or the composition (2).

[8] The process for producing a cathode active material for a lithium ion secondary battery according to any one of [1] to [7], wherein contact of the lithium-containing composite oxide with the composition (1) or the composition (2) is carried out by spraying the composition (1) or the composition (2) to the lithium-containing composite oxide by a spray coating method.

[9] A cathode for a lithium ion secondary battery, which comprises a cathode active material for a lithium ion secondary battery produced by the production process as defined in any one of [1] to [8], and a binder.

[10] A lithium ion secondary battery comprising the cathode as defined in [9], an anode and a non-aqueous electrolyte.

Advantageous Effects of Invention

According to the production process of the present invention, it is possible to produce a cathode active material for a lithium ion secondary battery excellent in the cycle characteristics and the rate characteristics even when discharging is carried out at a high voltage, with good productivity. Further, according to the production process of the present invention, filtration and washing are unnecessary, and the lithium-containing composite oxide will not be agglomerate, whereby handling such as stirring is easy, and further, agglomeration is less likely to occur at the time of drying, whereby the productivity is remarkably improved.

Further, with a cathode for a lithium ion secondary battery using the cathode active material of the present invention and a lithium ion secondary battery using the cathode, excellent cycle characteristics and rate characteristics can be realized even when charging is carried out at a high voltage.

BRIEF DESCRIPTION OF DRAWINGS

FIG. 1 is a graph illustrating an Example for a process for producing a cathode active material for a lithium ion secondary battery of the present invention, and showing the relation between the liquid amount A of the composition 1 and the composition 2, and the oil absorption B of the lithium-containing composite oxide.

DESCRIPTION OF EMBODIMENTS

Now, the present invention will be described in detail.

[Process for Producing Cathode Active Material for Lithium Ion Secondary Battery]

The process for producing a cathode active material of the present invention is a process for producing a cathode active material for a lithium ion secondary battery, which comprises contacting a lithium-containing composite oxide containing Li element and a transition metal element with the following composition (1) and composition (2), and heating them, wherein the total amount A (ml/100 g) of composition (1) and composition (2) contacted per 100 g of the lithium-containing composite oxide is in the ratio of 0.1<A/B<5 based on the oil absorption B (ml/100 g) of the lithium-containing composite oxide:

composition (1): an aqueous solution containing cation M having at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, In, Sn, Sb, Bi, La, Ce, Pr, Nd, Gd, Dy, Er and Yb;

composition (2): an aqueous solution containing anion N having at least one element (n) selected from the group consisting of S, P, F and B, forming a hardly soluble salt when reacted with the cation M.

(Lithium-Containing Composite Oxide)

The lithium-containing composite oxide of the present invention contains Li element and a transition metal element.

As the transition metal element, for example, at least one member selected from the group consisting of Ni, Co, Mn, Fe, Cr, V and Cu may be used.

The lithium-containing composite oxide is preferably, for example, a compound (i) represented by the following formula (1), a compound (ii) which is an olivin metal lithium salt which is a substance represented by the following formula (2) or a composite thereof, a compound (iii) represented by the following formula (3-1) or a compound (iv) represented by the following formula (4). They may be used alone or in combination of two or more.

The lithium-containing composite oxide is particularly preferably the compound (iii) in view of a high capacity, most preferably a compound represented by the following formula (3-1).

(Compound (i))

$$Li_a(Ni_xMn_yCo_z)Me_bO_2 \quad (1)$$

In the formula (1), $0.95 \leq a \leq 1.1$, $0 \leq x \leq 1$, $0 \leq y \leq 1$, $0 \leq z \leq 1$, $0 \leq b \leq 0.3$, $0.90 \leq x+y+z+b \leq 1.05$, and Me is at least one member selected from the group consisting of Mg, Ca, Sr, Ba and Al.

The compound (i) represented by the formula (1) may, for example, be $LiCoO_2$, $LiNiO_2$, $LiMnO_2$, $LiMn_{0.5}Ni_{0.5}O_2$, $LiNi_{0.5}Co_{0.2}Mn_{0.3}O_2$, $LiNi_{0.85}Co_{0.10}Al_{0.05}O_2$ or $LiNi_{1/3}Co_{1/3}Mn_{1/3}O_2$.

(Compound (ii))

$$Li_LX_{x'}Y_{y'}O_{z'}F_g \quad (2)$$

In the formula (2), X is Fe(II), Co(II), Mn(II), Ni(II), V(II) or Cu(II), Y is P or Si, $0<L \leq 3$, $1 \leq x' \leq 2$, $1 \leq y' \leq 3$, $4 \leq z' \leq 12$ and $0 \leq g \leq 1$.

The olivin metal lithium salt (ii) may be $LiFePO_4$, $Li_3Fe_2(PO_4)_3$, $LiFeP_2O_7$, $LiMnPO_4LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$.

(Compound (iii))

The compound (iii) is a compound represented by the following formula (3-1). The representation of the compound represented by the following formula (3-1) is for the compositional formula before charge/discharge or treatments such as activation. Here, activation means to remove lithium oxide ($Li_2O$) or lithium and lithium oxide from the lithium-containing composite oxide. As a usual activation method, an electrochemical activation method of charging at a voltage higher than 4.4 V or 4.6 V (a value represented by a potential difference with $Li^+/Li$ oxidation-reduction potential) may be mentioned. Further, a chemical activation method by a chemical reaction using an acid such as sulfuric acid, hydrochloric acid or nitric acid may be mentioned.

$$Li(Li_xMn_yMe'_z)O_pF_q \quad (3\text{-}1)$$

In the formula (3-1), Me' is at least one element selected from the group consisting of Co, Ni, Cr, Fe, Al, Ti, Zr and Mg.

Further, in the formula (3-1), $0.09<x<0.3$, $y>0$, $z>0$, $1.9<p<2.1$ and $0≤q≤0.1$, and $0.4≤y/(y+z)≤0.8$, $x+y+z=1$ and $1.2<(1+x)/(y+z)$. That is, in the compound (iii), the proportion of Li exceeds 1.2 molar times the total amount of Mn and Me'. Further, the compound of the formula (3-1) is also characterized by containing Mn in a specific amount, and the proportion of Mn to the total amount of Mn and Me' is preferably from 0.4 to 0.8, more preferably from 0.55 to 0.75. When Mn is within the above range, the discharge capacity tends to be high. Here, q represents the proportion of F, or is 0 when F is not present. Further, p is a value determined according to x, y, z and q, and is from 1.9 to 2.1.

In a case where the lithium-containing composite oxide is the compound represented by the formula (3-1), the compositional ratio of the Li element to the total molar amount of the transition metal element is preferably $1.25≤(1+x)/(y+z)≤1.75$, more preferably $1.35≤(1+x)/(y+z)≤1.65$, particularly preferably $1.40≤(1+x)/(y+z)≤1.55$. When the compositional ratio is within the above range, a cathode material having a high discharge capacity per unit mass when a high discharge voltage of at least 4.6 V is applied, can be obtained.

The compound (iii) is more preferably a compound represented by the following formula (3-2):

$$Li(Li_xMn_yNi_vCo_w)O_p \quad (3\text{-}2)$$

In the formula (3-2), $0.09<x<0.3$, $0.36<y<0.73$, $0<v<0.32$, $0<w<0.32$, $1.9<p<2.1$ and $x+y+v+w=1$.

In the formula (3-2), the compositional ratio of the Li element to the total amount of Mn, Ni and Co element is $1.2<(1+x)/(y+v+w)<1.8$, preferably $1.35<(1+x)/(y+v+w)<1.65$, more preferably $1.45<(1+x)/(y+v+w)<1.55$.

The compound (iii) is particularly preferably $Li(Li_{0.16}Ni_{0.17}Co_{0.08}Mn_{0.59})O_2$, $Li(Li_{0.17}Ni_{0.17}Co_{0.17}Mn_{0.49})O_2 Li(Li_{0.17}Ni_{0.21}Co_{0.08}Mn_{0.54})O_2$, $Li(Li_{0.17}Ni_{14}Co_{0.14}Mn_{0.55})O_2$, $Li(Li_{0.18}Ni_{0.12}Co_{0.12}Mn_{0.58})O_2$, $Li(Li_{0.18}Ni_{0.16}Co_{0.12}Mn_{0.54})O_2$, $Li(Li_{0.20}Ni_{0.12}Co_{0.08}Mn_{0.60})O_2$, $Li(Li_{0.20}Ni_{0.16}Co_{0.08}Mn_{0.56})O_2$ or $Li(Li_{0.20}Ni_{0.13}Co_{0.13}Mn_{0.54})O_2$.

The compound (iii) is preferably one having a layered rock salt type crystal structure (space group R-3m). Further, in the compound (iii), as the proportion of the Li element to the transition metal element is high, in the XRD (X-ray diffraction: CuKα) measurement, a peak is observed within a range of 2θ=20 to 25° like layered $Li_2MnO_3$.

(Compound (iv))

$$Li(Mn_{2-x}Me''_x)O_4 \quad (4)$$

In the formula (4), $0≤x<2$, and Me'' is at least one member selected from the group consisting of Co, Ni, Fe, Ti, Cr, Mg, Ba, Nb, Ag and Al.

The compound (iv) represented by the formula (4) may be $LiMn_2O_4$, $LiMn_{1.5}Ni_{0.5}O_4$, $LiMn_{1.0}Co_{1.0}O_4$, $LiMn_{1.85}Al_{0.15}O_4$ or $LiMn_{1.9}Mg_{0.1}O_4$.

The lithium-containing composite oxide is preferably in the form of particles, and the average particle size ($D_{50}$) is preferably from 0.03 to 30 μm, more preferably from 0.04 to 25 μm, particularly preferably from 0.05 to 20 μm. In the present invention, the average particle size ($D_{50}$) means a volume-based cumulative 50% size which is a particle size at a point of 50% on an accumulative curve when the accumulative curve is drawn by obtaining the particle size distribution on the volume basis and taking the whole to be 100%. The particle size distribution is obtained from the frequency distribution and accumulative volume distribution curve measured by means of a laser scattering particle size distribution measuring apparatus. The measurement of particle sizes is carried out by sufficiently dispersing the powder in an aqueous medium by an ultrasonic treatment and measuring the particle size distribution (for example, by means of a laser diffraction/scattering type particle size distribution measuring apparatus Partica LA-950VII, manufactured by HORIBA Ltd).

In a case where the lithium composite oxide is a compound selected from the compounds (i), (iii) and (iv), the average particle size ($D_{50}$) is preferably from 3 to 30 μm, more preferably from 4 to 25 μm, particularly preferably from 5 to 20 μm. In a case where the lithium composite oxide is the compound (ii), the average particle size (D50) is preferably from 0.03 to 5 μm, more preferably from 0.04 to 1 μm, particularly preferably from 0.05 to 0.5 μm.

The specific surface area of the lithium-containing composite oxide is preferably from 0.1 to 30 $m^2/g$, particularly preferably from 0.15 to 25 $m^2/g$. When the specific surface area is from 0.1 to 30 $m^2/g$, a dense cathode electrode layer having a high capacity can be formed.

In a case where the lithium composite oxide is a compound selected from the compounds (i) and (iv), the specific surface area is preferably from 0.1 to 1 $m^2/g$, more preferably from 0.15 to 0.6 $m^2/g$. In a case where the lithium composite oxide is the compound (iii), the specific surface area is preferably from 0.3 to 10 $m^2/g$, more preferably from 0.5 to 5 $m^2/g$, particularly preferably from 1 to 4 $m^2/g$. In a case where the lithium composite oxide is the compound (ii), the specific surface area is preferably from 1 to 30 $m^2/g$, more preferably from 10 to 25 $m^2/g$.

As a method for producing the lithium-containing composite oxide, a method of mixing a precursor of the lithium-containing composite oxide obtained by a coprecipitation method (a coprecipitated composition) and a lithium compound, followed by firing, a hydrothermal synthesis method, a sol-gel method, a dry mixing method (solid phase method), an ion exchange method or a glass crystallization method may properly be employed. Here, since the discharge capacity will be improved when the transition metal element is uniformly contained in the lithium-containing composite oxide, it is preferred to employ a method of mixing a precursor of the lithium-containing composite oxide obtained by a coprecipitation method and a lithium compound, followed by firing.

(Composition (1) and Composition (2))

The composition (1) in the present invention is an aqueous solution containing cation M having at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, In, Sn, Sb, Bi, La, Ce, Pr, Nd, Gd, Dy, Er and Yb (hereinafter sometimes referred to as metal element (m)). The cation M may be an ion of the metal element (m) or may be a complex ion having the metal element (m). In view of the reactivity with the anion N, the cation M is preferably an ion of the metal element (m).

The metal element (m) is preferably Al, and the cation M is preferably $Al^{3+}$.

The composition (1) is preferably a solution having a water soluble metal compound (1) having the metal element (m) and forming the cation M in the aqueous solution, dissolved. Here, "water soluble" means a solubility (the mass [g] of a solute dissolved in 100 g of a saturated solution) in distilled water at 25° C. of higher than 2. When the solubility is higher than 2, the amount of the cation M contained in the composition (1) can be made large, whereby the after-mentioned covering layer (I) can efficiently be formed. Further, the solubility of the water soluble compound (1) is more preferably higher than 5, particularly preferably higher than 10.

The water soluble compound (1) may, for example, be an inorganic salt such as nitrate, sulfate or chloride, an organic salt or an organic complex such as acetate, citrate, maleate, formate, lactate or oxalate, or an amine complex, of the metal element (m). Among them, particularly preferred is a nitrate, an organic acid salt, an organic complex or an ammonium complex, which is likely to be decomposed by heat and which has high solubility in a solvent.

The water soluble compound (1) is preferably aluminum nitrate, aluminum acetate, aluminum oxalate, aluminum citrate, aluminum lactate, basic aluminum lactate or aluminum maleate.

Further, in this embodiment, in order to control the amount of the metal element (m) in the after-mentioned covering layer (I), the total amount of the metal element M contained in the composition (1) is preferably within a range of from 0.001 to 0.05, more preferably from 0.003 to 0.04, particularly preferably from 0.005 to 0.03, based on the total amount of the transition metal element contained in the lithium-containing composite oxide.

The composition (2) in the present invention is an aqueous solution containing anion N having at least one element (n) selected from the group consisting of S, P, F and B (hereinafter sometimes referred to as element (n)), forming a hardly soluble salt when reacted with the cation M.

The composition (2) is preferably one having a water soluble compound (2) having the element (n) and forming the anion N when dissociated in an aqueous solution, dissolved.

"Water-soluble" here also means a solubility (the mass [g] of a solute dissolved in 100 g of a saturated solution) in distilled water at 25° C. of higher than 2, in the same manner as in the case of the composition (1). When the solubility of the water soluble composition (2) is higher than 2, the amount of the anion N contained in the composition (2) can be made large, whereby the covering layer (I) can efficiently be formed. The solubility of the water soluble compound (2) is more preferably higher than 5, particularly preferably higher than 10.

The anion N may, for example, be specifically $SO_4^{2-}$, $SO_3^{2-}$, $S_2O_3^{2-}$, $SO_6^{2-}$, $SO_8^{2-}$, $PO_4^{3-}$, $P_2O_7^{4-}$, $PO_3^{3-}$, $PO_2^{3-}$, $F^-$, $BO_3^{3-}$, $BO_2^-$, $B_4O_7^{2-}$ or $B_5O_8^-$. Among them, in view of the stability and the handling efficiency, $SO_4^{2-}$, $PO_4^{3-}$ or $F^-$ is particularly preferred.

The water soluble compound (2) is a compound which has the element (n) and which can form a hardly soluble salt when reacted with the cation M, and may, for example, be an acid such as $H_2SO_4$, $H_2SO_3$, $H_2S_2O_3$, $H_2SO_6$, $H_2SO_8$, $H_3PO_4$, $H_4P_2O_7$, $H_3PO_3$, $H_3PO_2$, HF, $H_3BO_3$, $HBO_2$, $H_2B_4O_7$ or $HB_5O_8$, or a salt thereof, such as an ammonium salt, an amine salt, a lithium salt, a sodium salt or a potassium salt. Among them, in view of the handling efficiency and the safety, it is preferred to use a salt, rather than an acid. Further, particularly preferred is an ammonium salt, which is decomposed and removed when heated. Specifically, preferred is $(NH_4)_2SO_4$, $(NH_4)HSO_4$, $(NH_4)_3PO_4$, $(NH_4)_2HPO_4$, $(NH_4)H_2PO_4$, $NH_4F$ or the like.

Further, in this embodiment, in order to control the amount of the anion N in the after-mentioned covering layer (I), the amount (molar ratio) of the anion N contained in the composition (2) is preferably within a range of from 0.001 to 0.05, more preferably from 0.003 to 0.04, particularly preferably from 0.005 to 0.03, based on the total amount of the transition metal element contained in the lithium-containing composite oxide.

In the present invention, (the total amount of the cation M contained in the composition (1)×the average valence of the cation M)/(the total amount of the anion N contained in the composition (2)×the average valence of the anion N) is preferably from 0.1 to 10, more preferably from 0.2 to 4, particularly preferably from 0.3 to 2. Within this range, the lithium ion secondary battery will be excellent in the cycle characteristics and the rate characteristics.

Further, when (the total amount of the cation M contained in the composition (1)×the average valence of the cation M)/(the total amount of the anion N contained in the composition (2)×the average valence of the anion N) is less than 1, the charge and discharge efficiency will improve, and accordingly it is preferably from 0.1 to 0.99, more preferably from 0.2 to 0.9, particularly preferably from 0.3 to 0.8. It is considered that since the negative charge by the anion N is more significant than the positive charge by the cation M, excess lithium ions contained in the lithium-containing composite oxide are bonded to the anion N, whereby the charge and discharge efficiency will improve.

In the present invention, as the solvent for the composition (1) and the composition (2), water may be used, and a water soluble alcohol or a polyol may be added within a range not to impair the solubility of the water soluble compound (1) and the water soluble compound (2). The water soluble alcohol may be methanol, ethanol, 1-propanol or 2-propanol. The polyol may be ethylene glycol, propylene glycol, diethylene glycol, dipropylene glycol, polyethylene glycol, butanediol or glycerin. The total content of the water soluble alcohol and polyol contained in the solvent is preferably from 0 to 20 mass %, more preferably from 0 to 10 mass % to the entire amount of the solvent. The solvent particularly preferably consists solely of water, in view of the safety, the environment, the handling efficiency and the cost.

Each of the composition (1) and the composition (2) may further contain a pH adjusting agent so as to adjust the solubility of the water soluble compound (1) and the water soluble compound (2). The pH adjusting agent is preferably one which is volatilized or decomposed at the time of heating. Specifically, it is preferably an organic acid such as acetic acid, citric acid, lactic acid, formic acid, maleic acid or oxalic acid, or ammonia. When a pH adjusting agent which is volatilized or decomposed is used, impurities hardly remain, whereby favorable battery characteristics are likely to be obtained.

The pH of each of the composition (1) and the composition (2) is preferably from 2 to 12, more preferably from 3 to 11, particularly preferably from 4 to 10. When the pH is within the above range, elution of the Li element and the transition metal from the lithium-containing composite oxide tends to be small when the lithium-containing composite oxide is contacted with the composition (1) and the composition (2), and further, the amount of impurities such as the pH adjusting agent tends to be small, whereby favorable battery characteristics are likely to be obtained.

In the present invention, to contact the lithium-containing composite oxide with the composition (1) and the composition (2), particularly preferred is a spray coating method. The spray coating method is a simple process, and by this process, the surface of the lithium-containing composite oxide can uniformly be covered with the after-mentioned covering layer (I).

With respect to the order of contact of the composition (1) and the composition (2) with the lithium-containing composite oxide, the composition (1) may be contacted with the lithium-containing composite oxide and then the composition (2) is contacted, the composition (2) may be contacted and then the composition (1) is contacted, the composition (1) and the composition (2) may be alternately contacted several times, or the composition (1) and the composition (2) may be contacted simultaneously. Particularly preferably, the composition (1) is contacted with the lithium-containing composite oxide and then the composition (2) is contacted, whereby the reaction of the cation M and the anion N is likely to proceed.

The concentration of the water soluble compound (1) contained in the composition (1) is preferably higher, since it is necessary to remove the solvent by heating in the subsequent step. Further, if the concentration is too high, the viscosity tends to be high, and the uniform mixing property of the lithium-containing composite oxide with the composition (1) will be decreased. Accordingly, the concentration of the water soluble compound (1) contained in the composition (1) is preferably from 0.5 to 30 mass %, particularly preferably from 2 to 20 mass % as calculated as the metal element (m).

The concentration of the water soluble compound (2) contained in the composition (2) is also preferably higher, since it is necessary to remove the solvent by heating in the subsequent step. Further, in the same manner as the composition (1), if the concentration is too high, the viscosity tends to be high, and the uniform mixing property of the lithium-containing composite oxide with the composition (2) will be decreased. Accordingly, the concentration of the water soluble compound (2) contained in the composition (2) is preferably from 0.5 to 30 mass %, particularly preferably from 2 to 20 mass % as calculated as the anion N.

In the present invention, the total amount A (ml/100 g) of the composition (1) and the composition (2) to be contacted per 100 g of the lithium-containing composite oxide is within a range of 0.1<A/B<5 to the oil absorption B (ml/100 g) of the lithium-containing composite oxide. The oil absorption B is obtained in accordance with the method as disclosed in JIS-K-5101-13-1:2004. When the ratio (A/B) is within a range of the formula {0.1<A/B<5}, the after-mentioned covering layer (I) can uniformly be formed, filtration will be unnecessary, and further, the solvent to be evaporated at the time of heating is small, thus improving productivity. Further, it is particularly preferred that the ratio (A/B) is within a range of the formula {0.1<A/B<0.7}, whereby the lithium-containing composite oxide will not be agglomerated at the time of spray coating, and stirring will easily be conducted.

When the above ratio (A/B) is at least 0.7, it is preferred to contact the composition (1) and the composition (2) with the lithium-containing composite oxide with drying so as to prevent the lithium-containing composite oxide from being agglomerated. Spray coating and drying may be carried out alternately, or spray coating may be carried out with heating for dying simultaneously. The drying temperature is preferably from 40 to 200° C., more preferably from 60 to 150° C.

In a case where the lithium-containing composite oxide is agglomerated, it is preferably pulverized.

The discharge amount of the composition (1) and the composition (2) in the spray coating method is preferably from 0.005 to 0.1 g/min per 1 g of the lithium-containing composite oxide.

Further, the ratio of {the amount of the composition (1)/the amount of the composition (2)} is preferably within a range of from 0.1 to 10, particularly preferably within a range of from 0.25 to 4, whereby the mixing property of the composition (1) and the composition (2) with the lithium-containing composite oxide will be good.

Further, in the production process of the present invention, it is preferred that the composition (1) or the composition (2) is contacted with the lithium-containing composite oxide by adding the composition (1) or the composition (2) to the lithium-containing composite oxide with stirring and mixing them. As a stirring apparatus, a stirring machine with low shearing force such as a drum mixer or solid air may be employed. By contacting the composition (1) or the composition (2) with the lithium-containing composite oxide with stirring for mixing, the after-mentioned particles (II) having the surface of the lithium-containing composite oxide more uniformly covered with the after-mentioned covering layer (I), can be obtained.

Further, in the process for producing a cathode active material of the present invention, the lithium-containing composite oxide is contacted with the composition (1) and the composition (2), and they are heated. By heating, the desired cathode active material is obtained and in addition, volatile impurities such as water and organic components can be removed. It is preferred to contact the composition (1) and the composition (2) with the lithium-containing composite oxide, and to dry and heat them while the entire amount of the composition (1) and the composition (2) are supported, without filtration and the like.

Heating is preferably carried out in an oxygen-containing atmosphere. The heating temperature is preferably from 250 to 700° C., more preferably from 350 to 600° C. When the heating temperature is at least 250° C., the after-mentioned covering layer (I) containing the metal element (m) and the anion N is likely to be formed. Further, volatile impurities such as remaining water tend to be small, whereby a decrease in the cycle characteristics can be suppressed. When the heating temperature is at most 700° C., it is possible to prevent a decrease of the capacity by diffusion of the metal element (m) into the inside of the cathode active material of the present invention. In a case where the surface of the lithium-containing composite oxide is covered with the after-mentioned covering layer (I) which is amorphous, the heating temperature is preferably from 250 to 550° C., more preferably from 350 to 500° C. When the heating temperature is at most 550° C., the after-mentioned covering layer (I) will hardly be crystallized.

The heating time is preferably from 0.1 to 24 hours, more preferably from 0.5 to 18 hours, particularly preferably from 1 to 12 hours. When the heating time is within the above range, it is possible to efficiently cover the surface of the lithium-containing composite oxide with the after-mentioned covering layer (I).

The pressure at the time of heating is not particularly limited, preferably normal pressure or elevated pressure, particularly preferably normal pressure.

[Cathode Active Material for Lithium Ion Secondary Battery]

The cathode active material produced by the production process of the present invention is particles (II) having a covering layer (I) containing the metal element (m) and the anion N formed on the surface of the lithium-containing composite oxide containing Li element and a transition metal element.

(Covering Layer (I))

The covering layer (I) is formed by the composition (1) and the composition (2) used in the above production process. That is, the covering layer (I) contains the anion N having the metal element (m) and the element (n).

The covering layer (I) preferably comprises a hardly soluble salt having the cation M having the metal element (m) and the anion N bonded by ionic bond.

Here, "hardly soluble" means a solubility (the mass [g] of a solute dissolved in 100 g of a saturated solution) in distilled water at 25° C. of from 0 to 2. When the solubility is from 0 to 2, the salt is highly stable and hardly adsorbs moisture, whereby impurities such as moisture will not remain, and the cycle characteristics will improve. Further, the solubility of the hardly soluble salt is more preferably from 0 to 1, whereby the above effect will be remarkable, and is particularly preferably from 0 to 0.5.

Further, as the anion N, the above anion N may similarly be used, and the preferred embodiments are also the same.

The covering layer (I) may, for example, be specifically $BaSO_4$, $CaSO_4$, $PbSO_4$, $SrSO_4$, $AlPO_4$, $LaPO_4$, $Ce_3(PO_4)_4$, $Mg_3(PO_4)_2$, $Li_3(PO_4)_2$, $Ba_3(PO_4)_2$, $Zr_3(PO_4)_4$, $Nb_3(PO_4)_5$, $Ca_3(PO_4)_2$, $Ba_3(PO_4)_2$, $CePO_4$, $BiPO_4$, $LaF_3$, $AlF_3$, $LiF$, $SrF_2$, $BaF_2$, $CeF_3$, $InF_3$, $MgF_2$, $MgF_2$, $CaF_2$, $ZrF_4$, $NbF_3$ or $NbF_5$, but is not particularly limited. Among them, preferred is $AlPO_4$, $Nb_3(PO_4)_5$, $Zr_3(PO_4)_4$, $AlF_3$, $ZrF_4$, $NbF_3$ or $NbF_5$, particularly preferably $AlPO_4$ or $AlF_3$.

In a case where the covering layer (I) contains an oxide, preferred is $Al_2O_3$, $ZrO_2$, $Nb_2O_3$ or $Nb_2O_5$, particularly preferred is $Al_2O_3$. In a case where the covering layer (I) contains a hydroxide, preferred is $Al(OH)_3$, $Zr(OH)_4$, $Nb(OH)_3$ or $Nb(OH)_5$, and particularly preferred is $Al(OH)_3$.

For the covering layer (I), one or more types of the above compounds may be employed.

The covering layer (I) may contain a lithium salt formed by reaction of lithium ion contained in the lithium-containing composite oxide and the anion N. The lithium salt may, for example, be $LiF$, $Li_3PO_4$ or $Li_2SO_4$.

With the cathode active material obtained by the production process of the present invention, it is considered that by the covering layer (I), contact of the lithium-containing composite oxide with the electrolytic solution can be reduced, and accordingly the elution of the transition metal element such as Mn from the lithium-containing composite oxide surface to the electrolytic solution is suppressed, and the cycle characteristics will be improved. Further, it is possible to prevent a decomposed product of the electrolytic solution from being attached to the surface of the lithium-containing composite oxide, whereby the rate characteristics are considered to be improved.

The covering layer (I) may be crystalline or may be amorphous, and is preferably amorphous. Here, amorphous means that no peak attributable to the covering layer (I) is observed in X-ray diffraction measurement (hereinafter sometimes referred to as XRD). The reason is not clearly understood, but is considered as follows. When the covering layer (I) is amorphous, the covering layer (I) is likely to be eluted to the electrolytic solution and functions as a sacrificial layer, whereby elution of the transition metal element such as Mn on the surface of the lithium-containing composite oxide to the electrolytic solution can be suppressed, and the cycle characteristics will be improved.

In a case where the covering layer (I) is in the form of particles, the average particle size of the covering layer (I) is preferably from 0.1 to 100 nm, more preferably from 0.1 to 50 nm, particularly preferably from 0.1 to 30 nm. The shape and the average particle size of the covering layer (I) can be evaluated by an electron microscope such as a SEM (scanning electron microscope) or a TEM (transmission electron microscope). The average particle size is represented by an average of particle sizes of particles covering the surface of the lithium-containing composite oxide.

(Particles (II))

The particles (II) in the present invention are particles having the surface of the lithium-containing composite oxide covered with the covering layer (I). Here, "covered" means a state where the covering layer (I) is chemically adsorbed or physically adsorbed to a part of or the entire surface of the lithium-containing composite oxide.

The shape of the particles (II) may be the form of particles, a film, fibers, agglomerates or the like. In a case where the particles (II) are in the form of particles, the average particle size of the particles (II) is preferably from 3 to 30 μm, more preferably from 4 to 25 μm, particularly preferably from 5 to 20 μm.

In the particles (II), at least part of the surface of the lithium-containing composite oxide is covered with the covering layer (I). Particularly, the particles (II) are preferably particles having a part of or the entire surface of the particles (II) covered with an amorphous layer of the covering layer (I).

In the particles (II), the surface of the lithium-containing composite oxide being covered with the covering layer (I) can be evaluated, for example, by cutting a particle (II), then polishing the cross-section, followed by elemental mapping by X-ray microanalyzer analysis (EPMA). By such an evaluation method, it is possible to confirm that the covering layer (I) is present in a larger amount in a range of 30 nm from the surface than the center of the lithium-containing composite oxide (here, the center means a portion not in contact with the surface of the lithium-containing composite oxide, preferably a portion where the average distance from the surface is the largest).

With respect to the covering layer (I) in the particles (II), the amount (molar ratio) of the metal element (m) in the covering layer (I) is preferably from 0.001 to 0.05, more preferably from 0.003 to 0.04, particularly preferably from 0.005 to 0.03 to the transition metal element in the lithium-containing composite oxide. Within the above range, a cathode active material having a large discharge capacity and excellent rate characteristics and cycle characteristics will be obtained.

With respect to the covering layer (I) in the particles (II), the amount (molar ratio) of the anion N in the covering layer (I) is preferably from 0.001 to 0.05, more preferably from 0.003 to 0.04, particularly preferably from 0.005 to 0.03 to the transition metal element in the lithium-containing composite oxide.

In the present invention, (the amount (mol) of the metal element (m) in the covering layer (I)×the average valence of the metal element (m))/(the amount (mol) of the anion N in the covering layer (I)×the average valence of the anion N) is preferably from 0.1 to 10, more preferably from 0.2 to 4, particularly preferably from 0.3 to 2. Within such a range, excellent cycle characteristics and rate characteristics will be obtained.

Further, when (the amount (mol) of the metal element (m) in the covering layer (I)×the average valence of the metal element (m))/(the amount (mol) of the anion N in the covering layer (I)×the average valence of the anion N) is less than 1, the charge and discharge efficiency will improve, and accordingly it is preferably from 0.1 to 0.99, more preferably from 0.2 to 0.9, particularly preferably from 0.3 to 0.8. It is considered that since the negative charge by the anion N is more significant than the positive charge by the metal element (m), the excess lithium ions contained in the lithium-containing composite oxide are bonded to the anion N, whereby the charge and discharge efficiency will improve.

The amount (mol) of the metal element (m) present in the covering layer (I) in the particles (II) can be measured by ICP (inductively coupled plasma) measurement of the cathode active material dissolved in an acid. In a case where the amount (mol) of the metal element (m) present in the covering layer (I) cannot be obtained by the ICP measurement, it may be calculated based on the amount of the metal element (m) in the lithium-containing composite oxide and the composition (1).

The amount (mol) of the anion N present in the covering layer (I) in the particles (II) can be measured by ion chromatography measurement of the cathode active material dissolved in an acid. In a case where the amount (mol) of the anion N present in the covering layer (I) cannot be obtained by the ion chromatography measurement, it may be calculated based on the amount of the element (n) in the lithium-containing composite oxide and the composition (2).

The cathode active material of the present invention, which has the covering layer (I) on at least part of the surface of the lithium-containing composite oxide, has a high discharge capacity and excellent rate characteristics and cycle characteristics.

<Cathode for Lithium Ion Secondary Battery>

The cathode for a lithium ion secondary battery of the present invention comprises a cathode active material layer containing the above cathode active material of the present invention, an electrically conductive material and a binder formed on a cathode current collector (cathode surface). As a method for producing the cathode for a lithium ion secondary battery, for example, a method of supporting the cathode active material of the present invention, an electrically conductive material and a binder on a cathode current collector may be mentioned. On that occasion, the electrically conductive material and the binder can be supported on a cathode current collector by dispersing them in a solvent and/or a dispersion medium to prepare a slurry, or kneading them with a solvent and/or a dispersion medium to prepare a kneaded product, and applying the prepared slurry or kneaded product to the cathode current collector e.g. by coating.

The electrically conductive material may, for example, be carbon black such as acetylene black, graphite or ketjen black.

The binder may, for example, be a fluorinated resin such as polyvinylidene fluoride or polytetrafluoroethylene, a polyolefin such as polyethylene or polypropylene, a polymer or copolymer containing unsaturated bonds such as styrene/butadiene rubber, isoprene rubber or butadiene rubber, or an acrylic acid type polymer or copolymer such as an acrylic acid copolymer or a methacrylic acid copolymer.

The cathode current collector may be aluminum or an aluminum alloy.

<Lithium Ion Secondary Battery>

The lithium ion secondary battery of the present invention comprises the cathode for a lithium ion secondary battery of the present invention, an anode and a non-aqueous electrolyte.

The anode comprises an anode current collector and an anode active material layer containing an anode active material formed on the anode current collector. It can be produced, for example, by kneading an anode active material with an organic solvent to prepare a slurry, and applying the prepared slurry on the anode current collector, followed by drying and pressing.

The anode current collector may, for example, be a metal foil such as a nickel foil or a copper foil.

The anode active material is a material capable of adsorbing and desorbing lithium ions at a relatively low potential and may, for example, be lithium metal, a lithium alloy, a carbon material, an oxide consisting mainly of a metal in Group 14 or 15 of the periodic table, a carbon compound, a silicon carbide compound, a silicon oxide compound, titanium sulfide or a boron carbide compound.

The carbon material for the anode active material may, for example, be non-graphitizable carbon, artificial carbon, natural graphite, thermally decomposed carbon, cokes such as pitch coke, needle coke or petroleum coke, graphites, glassy carbons, an organic polymer compound fired product obtained by firing and carbonizing a phenol resin, furan resin, etc. at a suitable temperature, carbon fibers, activated carbon or carbon blacks.

The metal in Group 14 of the periodic table may, for example, be silicon or tin, and is most preferably silicon.

In addition, a material which may be used as the anode active material may, for example, be an oxide such as iron oxide, ruthenium oxide, molybdenum oxide, tungsten oxide, titanium oxide or tin oxide, or a nitride such as $Li_{2.6}Co_{0.4}N$.

As the non-aqueous electrolytic solution, it is possible to use one prepared by suitably combining an organic solvent and an electrolyte. As the organic solvent, any solvent known as an organic solvent for an electrolytic solution may be used, and for example, it is possible to use propylene carbonate, ethylene carbonate, diethyl carbonate, dimethyl carbonate, 1,2-dimethoxyethane, 1,2-diethoxyethane, diglyme, triglyme, γ-butyrolacton diethyl ether, sulfolan, methyl sulfolan, acetonitrile, an acetic acid ester, a butylic acid ester, a propionic acid ester, etc. Particularly, from the viewpoint of the voltage stability, it is preferred to use a cyclic carbonate such as propylene carbonate, or a chain-structured carbonate such as dimethyl carbonate or diethyl carbonate. Such organic solvents may be used alone, or two or more of them may be used as mixed.

As the non-aqueous electrolyte, it is possible to use a solid electrolyte containing an electrolyte salt, a polymer electrolyte, a solid or gelled electrolyte having an electrolyte mixed or dissolved in e.g. a polymer compound, etc.

The solid electrolyte may be any material so long as it has lithium ion conductivity, and for example, either an inorganic solid electrolyte or a polymer electrolyte may be used.

As the inorganic solid electrolyte, it is possible to use lithium nitride, lithium iodide, etc.

As the polymer electrolyte, it is possible to use e.g. an electrolyte salt and a polymer compound which dissolves the electrolyte salt. As the polymer compound which dissolves the electrolyte salt, it is possible to use polyethylene oxide, polypropylene oxide, polyphosphazene, polyaziridine, polyethylene sulfide, polyvinyl alcohol, polyvinylidene fluoride, polyhexafluoropropylene, or a derivative, mixture or composite thereof.

As the gelled electrolyte or the like, any polymer material which is gelled upon absorption of the above non-aqueous electrolytic solution may be employed. The polymer material may, for example, be a fluorinated polymer material such as poly(vinylidene fluoride) or poly(vinylidene fluoride-co-hexafluoropropylene), polyacrylonitrile, a copolymer of polyacrylonitrile, or an ether type polymer material such as polyethylene oxide or a copolymer or cross-linked product of polyethylene oxide. The monomer to be copolymerized may, for example, be polypropylene oxide, methyl methacrylate, butyl methacrylate, methyl acrylate or butyl acrylate.

As the gelled electrolyte, particularly preferred is a fluorinated polymer material from the viewpoint of the stability against the redox reaction.

As the electrolyte salt, any electrolyte salt to be used for this type of battery may be used, and for example, $LiClO_4$, $LiPF_6$, $LiBF_4$ or $CF_3SO_3Li$ may be used.

The shape of the lithium ion secondary battery of the present invention may be suitably selected depending on the intended use from e.g. a coin-shape, a sheet-form (film-form), a folded shape, a wound cylinder with bottom, a button shape, etc.

According to the process for producing a cathode active material for a lithium ion secondary battery of the present invention, it is possible to produce a cathode active material for a lithium ion secondary battery having excellent cycle characteristics and rate characteristics even when discharging is carried out at a high voltage, with good productivity. Further, according to the production process of the present invention, filtration and washing are unnecessary, the lithium-containing composite oxide will not be agglomerated and handling such as stirring is easy, and further, agglomeration is less likely to occur at the time of drying, whereby the productivity will remarkably improve.

Further, the cathode active material for a lithium ion secondary battery obtained by the production process of the present invention has excellent cycle characteristics and rate characteristics even when discharging is carried out at a high voltage. Further, a cathode for a lithium ion secondary battery using the cathode active material, and a lithium ion secondary battery using the cathode, can realize excellent cycle characteristics and rate characteristics even when discharging is carried out at a high voltage.

EXAMPLES

Now, the present invention will be described in further detail with reference to Examples. However, it should be understood that the present invention is by no means restricted to such specific Examples.

Example for Synthesis of Lithium-Containing Composite Oxide

Distilled water (1,245.9 g) was added to nickel(II) sulfate hexahydrate (140.6 g), cobalt(II) sulfate heptahydrate (131.4 g) and manganese(II) sulfate pentahydrate (482.2 g) to obtain a raw material solution. Distilled water (320.8 g) was added to ammonium sulfate (79.2 g) to obtain an ammonia solution. Distilled water (1,920.8 g) was added to ammonium sulfate (79.2 g) to obtain a mother liquid. By adding distilled water (600 g), sodium hydroxide (400 g) was uniformly dissolved to obtain a pH-adjusting liquid.

Into a 2 L baffle-equipped glass reactor, the mother liquid was put and heated to 50° C. by a mantle heater, and the pH-adjusting liquid was added to bring the pH to be 11.0. While stirring the solution in the reactor by anchor-type stirring vanes, the raw material solution was added at a rate of 5.0 g/min, and the ammonia solution was added at a rate of 1.0 g/min, to have a composite hydroxide of nickel, cobalt and manganese precipitated. During the addition of the raw material solution, the pH-adjusting liquid was added to maintain the pH in the reactor to be 11.0. Further, in order to prevent oxidation of the precipitated hydroxide, nitrogen gas was introduced into the reactor at a flow rate of 0.5 L/min. Further, the liquid was continuously withdrawn so that the liquid amount in the reactor would not exceed 2 L.

In order to remove impurity ions from the obtained composite hydroxide of nickel, cobalt and manganese, pressure filtration and dispersion to distilled water were repeated for washing. The washing was terminated when the electrical conductivity of the filtrate became 25 µS/cm, followed by drying at 120° C. for 15 hours to obtain a precursor.

The contents of nickel, cobalt and manganese in the precursor were measured by ICP and found to be 11.6 mass %, 10.5 mass % and 42.3 mass %, respectively (nickel:cobalt:manganese=0.172:0.156:0.672 by molar ratio).

The precursor (20 g) and lithium carbonate (12.6 g) having a lithium content of 26.9 mol/kg were mixed and fired at 900° C. for 12 hours in an oxygen-containing atmosphere to obtain a lithium-containing composite oxide in Synthesis Example. The composition of the obtained lithium-containing composite oxide in Synthesis Example was $Li(Li_{0.2}Ni_{0.137}Co_{0.125}Mn_{0.538})O_2$. The lithium-containing composite oxide in Synthesis Example had an average particle size D50 of 5.9 µm, and a specific surface area of 2.6 $m^2/g$ as measured by means of BET (Brunauer, Emmett, Teller) method. The oil absorption was measured using purified linseed oil in accordance with JIS-K-5101-13-1:2004, whereupon it was 44 (g/100 g).

Example 1

Example for Production of Lithium-Containing Composite Oxide Having Covering Layer Wherein Cation M is $Al^{3+}$ and Anion N is $PO_4^{3-}$ 3.0 g of distilled water was added to 7.0 g of an aluminum lactate aqueous solution (Al content: 4.5 mass %, pH: 4.6) to prepare an aqueous aluminum solution (composition (1)). Further, 7.7 g of distilled water was added to 2.3 g of $(NH_4)_2HPO_4$ to prepare a phosphate aqueous solution (composition (2)).

Then, 1 g of the prepared aluminum aqueous solution was added by spraying to 10 g of the lithium-containing composite oxide in Example with stirring, and the lithium-containing composite oxide in Synthesis Example and the aluminum aqueous solution were contacted with each other while being mixed. Then, 1 g of the prepared phosphate aqueous solution was added by spraying, and the lithium-containing composite oxide in Synthesis Example and the phosphate aqueous solution were contacted with each other while being mixed. On that occasion, {(the total amount A of the composition (1) and the composition (2) contacted per 100 g of the lithium-containing composite oxide)/(the oil absorption B of the lithium-containing composite oxide)}=20/44=0.45. The lithium-containing composite oxide will not be agglomerated, and handling such as stirring was easy.

Then, the obtained mixture was dried at 90° C. for 2 hours and then heated in an oxygen-containing atmosphere at 400° C. for 8 hours to obtain a cathode active material in Example 1 comprising particles (II) having a covering layer (I) containing the metal element Al and the anion $PO_4^{3-}$ formed on the surface of the lithium-containing composite oxide.

In the obtained cathode active material, the amount of covering aluminum based on the total amount of nickel, cobalt and manganese as the transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.013. Further, {(the number of moles of the covering Al)/(the number of moles of covering $PO_4^{3-}$)}=1, and the compound forming the covering layer (I) is considered to be $AlPO_3$.

Then, with respect to the obtained cathode active material, XRD measurement using CuKα rays as an X-ray source was carried out. For the XRD measurement, RINT-TTR-III, tradename, manufactured by Rigaku Corporation was used. The XRD measurement conditions were such that the voltage was 50 kV, the tube current was 300 mA, the measurement range 2θ=10 to 80° with a scan axis 2θ/θ, the sampling width was 0.02°, and the scanning speed was 1°/min. From the XRD spectrum, the cathode active material was confirmed to have a layered rock salt type crystal structure (space group R-3m). Further, a peak of the layered $Li_2MnO_3$ was confirmed within a range of $2\theta$=20 to 25°. On the other hand, since no peak of the covering layer (I) was observed in the XRD spectrum, the covering layer (I) is amorphous.

Example 2

Example for Production of Lithium-Containing Composite Oxide Having Covering Layer Wherein Cation M is $Al^{3+}$ and Anion N is $F^-$ As the composition (2), 9.57 g of distilled water was added to 0.43 g of $NH_4F$ to prepare an ammonium fluoride aqueous solution. In the same manner as in Example 1 except that the ammonium fluoride aqueous solution was used instead of the phosphate aqueous solution, a cathode active material in Example 2 comprising particles (II) having a covering layer (I) containing the metal element Al and the anion $F^-$ formed on the surface of the lithium-containing composite oxide was obtained.

In the cathode active material, the amount of covering aluminum based on the total amount of nickel, cobalt and manganese as the transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.013. Further, {(the number of moles of the covering $Al^{3+}$)/(the number of moles of the covering $F^-$)}=1, and since the composition (2) was contacted after the composition (1) was contacted with the lithium-containing composite oxide, the covering layer (I) is considered to be a gradient film comprising $Al_2O_3$ in the inside, $AlF_3$ on the outside and AlOF in the middle.

From the XRD spectrum, the cathode active material was confirmed to have a layered rock salt type crystal structure (space group R-3m). Further, a peak of the layered $Li_2MnO_3$ was observed within a range of $2\theta$=20 to 25°. Since no peak of the covering layer (I) was observed in the XRD spectrum, the covering layer (I) is amorphous.

Example 3

Example for Production of Lithium-Containing Composite Oxide Having Covering Layer Wherein Cation M is $Al^{3+}$ and Anion N is $F^-$ As the composition (2), 8.70 g of distilled water was added to 1.30 g of $NH_4F$ to prepare an ammonium fluoride aqueous solution. In the same manner as in Example 1 except that the ammonium fluoride aqueous solution was used instead of the phosphate aqueous solution, a cathode active material in Example 3 comprising particles (II) having a covering layer (I) containing the metal element Al and the anion $F^-$ formed on the surface of the lithium-containing composite oxide was obtained.

In the cathode active material, the amount of covering aluminum based on the total amount of nickel, cobalt and manganese as the transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.013. Further, {(the number of moles of the covering $Al^{3+}$)/(the number of moles of the covering $F^-$)}=3, and the covering layer (I) is considered to be $AlF_3$.

From the XRD spectrum, the cathode active material was confirmed to have a layered rock salt type crystal structure (space group R-3m). Further, a peak of the layered $Li_2MnO_3$ was observed within a range of $2\theta$=20 to 25°. Since no peak of the covering layer (I) was observed in the XRD spectrum, the covering layer (I) is amorphous.

Example 4

Example for Production of Lithium-Containing Composite Oxide Having Covering Layer Wherein Cation M is $Al^{3+}$ and Anion N is $F^-$ As the composition (2), 7.40 g of distilled water was added to 2.60 g of $NH_4F$ to prepare an ammonium fluoride aqueous solution. In the same manner as in Example 1 except that the ammonium fluoride aqueous solution was used instead of the phosphate aqueous solution, a cathode active material in Example 4 comprising particles (II) having a covering layer (I) containing the metal element Al and the anion $F^-$ formed on the surface of the lithium-containing composite oxide was obtained.

In the cathode active material, the amount of covering aluminum based on the total amount of nickel, cobalt and manganese as the transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.013. Further, {(the number of moles of the covering $Al^{3+}$)/(the number of moles of the covering $F^-$)}=6, the amount of the covering F is large, whereby the covering layer (I) is considered to be $AlF_3$ and LiF.

From the XRD spectrum, the cathode active material was confirmed to have a layered rock salt type crystal structure (space group R-3m). Further, a peak of the layered $Li_2MnO_3$ was confirmed within a range of $2\theta$=20 to 25°. Since no peak of the covering layer (I) was observed in the XRD spectrum, the covering layer (I) is amorphous.

Comparative Example 1

Example for Production of Lithium-Containing Composite Oxide Having Covering Layer Wherein Cation M is $Al^{3+}$ and No Anion N is Contained In the same manner as in Example 1 except that the composition (2) was not sprayed, a cathode active material in Comparative Example 1 comprising particles (II) having the surface of the lithium-containing composite oxide covered with the metal element Al was obtained. On that occasion, {(the total amount A of the composition (1) and the composition (2) contacted per 100 g of the lithium-containing composite oxide)/(the oil absorption B of the lithium-containing composite oxide)}=10/44=0.23. The lithium-containing composite oxide was not agglomerated, and handling such as stirring was easy.

In the cathode active material, the amount of covering aluminum based on the total amount of nickel, cobalt and manganese as the transition metal elements in the lithium-containing composite oxide in Synthesis Example by the molar ratio (covering amount) is {(the number of moles of the covering Al)/(the total number of moles of Ni, Co and Mn in the lithium-containing composite oxide before addition)}=0.013. Further, it was impossible to calculate {(the number of moles of the covering $Al^{3+}$)/(the number of moles of covering anion N)}, and the covering layer (I) is considered to be $Al_2O_3$.

Comparative Example 2

No Covering

The lithium-containing composite oxide in Synthesis Example was used as the cathode active material in Comparative Example 2 as it was without covering treatment.

Comparative Example 3

The procedure in Example 1 was changed, and the aluminum aqueous solution and the phosphate aqueous solution were mixed, whereupon a gel was precipitated, whereby the mixture could not be sprayed to the lithium-containing composite oxide.

Example for Production of Cathode Sheet

Each of the cathode active materials in Examples 1 to 4 and Comparative Examples 1 and 2 as the cathode active material, acetylene black (electrically conductive material) and a polyvinylidene fluoride solution (solvent: N-methylpyrrolidone) containing 12.1 mass % of polyvinylidene fluoride (binder) were mixed, and N-methylpyrrolidone was further added to prepare a slurry. The mass ratio of the cathode active material, acetylene black and polyvinylidene fluoride was 82/10/8. The slurry was applied on one side of an aluminum foil (cathode current collector) having a thickness of 20 μm by means of a doctor blade, followed by drying at 120° C. and roll pressing twice to prepare a cathode sheet. Cathode sheets obtained from the cathode active materials in Examples 1 to 4 are regarded as cathode sheets 1 to 4, respectively, and cathode sheets obtained from the cathode active materials in Comparative Examples 1 and 2 are regarded as cathode sheets 5 and 6.

Example for Production of Battery

Using each of the above-produced cathode sheets 1 to 6 as a cathode, a stainless steel simple sealed cell type lithium ion secondary battery was assembled in an argon globe box. A metal lithium foil having a thickness of 500 μm was used as an anode, a stainless steel plate having a thickness of 1 mm was used as an anode current collector, a porous propylene having a thickness of 25 μm was used as a separator, and as an electrolytic solution, a $LiPF_6$/EC (ethylene carbonate)+DEC (diethyl carbonate) (1:1) solution having a $LiPF_6$ concentration of 1 (mol/dm$^3$) (a mixed solution of EC and DEC in a volume ratio (EC:DEC=1:1) having $LiPF_6$ as a solute) was used.

Lithium ion secondary batteries obtained by using the cathode sheets 1 to 6 are regarded as lithium batteries 1 to 6, respectively.

Examples 1 to 6 for Evaluation of Battery Characteristics

Examples for Evaluation of Initial Capacity, Rate Characteristics and Cycle Characteristics Using the above-produced lithium batteries 1 to 6, the following evaluation was carried out. That is, the battery was charged to 4.6 V with a load current of 200 mA per 1 g of the cathode active material, and then discharged to 2.5 V with a load current of 100 mA per 1 g of the cathode active material. On the occasion, the discharge capacity of the cathode active material at from 4.6 to 2.5 V was taken as the 4.6 V initial capacity. Further, a value obtained by dividing the discharge capacity by the charge capacity was taken as the initial charge and discharge efficiency.

Then, the battery was charged to 4.6 V with a load current of 200 mA per 1 g of the charged and discharged cathode active material, and then discharged to 2.5 V at high rate with a load current of 400 mA per 1 g of the cathode active material. On that occasion, a value obtained by dividing the discharge capacity of the cathode active material at from 4.6 to 2.5 V at high rate discharging by the 4.6 V initial capacity was taken as the rate retention rate.

Then, a charge and discharge cycle of charging the battery to 4.6 V with a load current of 200 mA per 1 g of the charged and discharged cathode active material and discharging it to 2.5 V at high rate with a load current of 100 mA per 1 g of the cathode active material was repeatedly carried out 100 times. On that occasion, a value obtained by dividing the discharge capacity in the 100th 4.6 V charge and discharge cycle by the 4.6 V initial capacity was taken as the cycle retention rate.

The results of evaluation of the 4.6 V initial capacity, the rate retention rate and the cycle retention rate of the lithium batteries 1 to 6 are shown in the following Table 1. In Table 1, the metal salt/anion ratio is (the total amount of the cation M contained in the composition (1)×the average valence of the cation M)/(the total amount of the anion N contained in the composition (2)×the average valence of the anion N).

TABLE 1

| | Metal salt M | Anion N | Metal salt/anion ratio | 4.6 V initial capacity | Initial charge and discharge efficiency | Rate retention rate | Cycle retention rate |
|---|---|---|---|---|---|---|---|
| Lithium battery 1 | $Al^{3+}$ | $PO_4^{3-}$ | 1.0 | 220 | 73% | 83% | 88% |
| Lithium battery 2 | $Al^{3+}$ | $F^-$ | 0.33 | 215 | 68% | 82% | 89% |
| Lithium battery 3 | $Al^{3+}$ | $F^-$ | 1.0 | 216 | 70% | 83% | 87% |
| Lithium battery 4 | $Al^{3+}$ | $F^-$ | 2.0 | 221 | 75% | 83% | 86% |
| Lithium battery 5 | $Al^{3+}$ | — | — | 207 | 66% | 81% | 86% |
| Lithium battery 6 | — | — | — | 210 | 67% | 82% | 70% |

As shown in Table 1, it is evident that each of the lithium batteries 1 to 4 using the cathode active material comprising particles (II) covered with the covering layer (I) has a high initial capacity and a high initial charge and discharge efficiency and has an excellent cycle retention rate as compared with the lithium battery 6 using the cathode active material in Comparative Example 2 not covered.

Further, it is evident that each of the lithium batteries 1 to 4 using the cathode active material comprising particles (II) covered with the covering layer (I) has a high initial capacity and a high initial charge and discharge efficiency and has an excellent rate retention rate as compared with the lithium battery 5 using the cathode active material in Comparative Example 1 covered only with Al.

Example 5

In the same manner as in Synthesis Example for the lithium-containing composite oxide except that the firing temperature was changed, lithium-containing composite oxide differing in the oil absorption were synthesized. Further, commercially available ternary cathode material of Ni:Co:Mn=5:2:3 and lithium cobaltate were prepared. The oil absorption of the lithium-containing composite oxides was from 12 to 52 (g/100 g).

Then, to each lithium-containing composite oxide, the aluminum aqueous solution and the phosphate aqueous solution (composition (2)) were sprayed in the same manner as in Example 1. Cathode active materials comprising particles (II) covered with the covering layer (I) were obtained under conditions where the lithium-containing composite oxide would not be agglomerated and handling such as stirring would be easy, or under conditions where the lithium-containing composite oxide would be agglomerated and handling such as stirring would be difficult, by changing {(the total amount A of the composition (1) and the composition (2) contacted per 100 g of the lithium-containing composite oxide)/(the oil absorption B of the lithium-containing composite oxide)}.

The evaluation results in Example 5 are shown in the graph in FIG. 1 and the following Table 2.

TABLE 2

| | Oil absorption B [g/100 g] | A with which lithium-containing composite oxide would not be agglomerated [g/100 g] | A with which lithium-containing composite oxide would be agglomerated [g/100 g] |
|---|---|---|---|
| Lithium-containing composite oxide (fired at 800° C.) | 52 | 30 | 40 |
| Lithium-containing composite oxide (fired at 900° C.) | 44 | 20 | 36 |
| Lithium-containing composite oxide (fired at 1,000° C.) | 41 | 20 | 32 |
| Commercially available ternary lithium-containing composite oxide | 19 | 8 | 20 |
| Commercially available lithium cobaltate | 12 | 4 | 16 |

In the graph in FIG. 1, "x" indicates conditions where the lithium-containing composite oxide would be agglomerated, and "○" represents conditions where the lithium-containing composite oxide would not be agglomerated, and the solid line indicates A/B=0.7. From the results in Table 2 and FIG. 1, it was evident that the lithium-containing composite oxide would not be agglomerated, and handling such as stirring was easy under conditions where A/B<0.7.

In a case where A/B is at least 0.7, as shown in Example 3, it is possible to make handling such as stirring be easy by adding the composition (1) and the composition (2) while the mixture was occasionally dried so that the lithium-containing composite oxide would not be agglomerated.

As evident from the results in Examples 1 to 5 and Comparative Examples 1 and 2, when a cathode was prepared by using the cathode active material for a lithium ion secondary battery obtained by the production process of the present invention and a lithium ion secondary battery was constituted by using the cathode, the initial capacity is high, and excellent cycle retention rate and rate retention rate are obtained.

INDUSTRIAL APPLICABILITY

According to the present invention, it is possible to obtain a cathode active material for a lithium ion secondary battery having a high discharge capacity per unit mass and having excellent cycle characteristics and rate characteristic. The cathode active material is useful for lithium ion secondary batteries for electronic instruments such as mobile phones, and for vehicles, which are small in size and light in weight.

This application is a continuation of PCT Application No. PCT/JP2012/066063, filed on Jun. 22, 2012, which is based upon and claims the benefit of priority from Japanese Patent Application No. 2011-140493 filed on Jun. 24, 2011. The contents of those applications are incorporated herein by reference in its entirety.

What is claimed is:

1. A process for producing a cathode active material for a lithium ion secondary battery, comprising:
   contacting a lithium-containing composite oxide comprising Li element and a transition metal element with composition (1) and composition (2); and
   heating the lithium-containing composite oxide, the composition (1), and the composition (2), wherein
   the total amount A (ml/100 g) of the composition (1) and the composition (2) contacted per 100 g of the lithium-containing composite oxide is in the ratio of 0.7≤A/B based on the oil absorption B (ml/100 g) of the lithium-containing composite oxide, and the contacting of the composition (1) and the composition (2) with the lithium-containing composite oxide is carried out by spraying the composition (1) and the composition (2) to the lithium-containing composite oxide, and by drying the composition (1) and the composition (2) simultaneously or alternatively with the spraying:
   composition (1): an aqueous solution comprising containing cation M which comprises having at least one metal element (m) selected from the group consisting of Li, Mg, Ca, Sr, Ba, Y, Ti, Zr, Hf, V, Nb, Ta, Cr, Mo, W, Mn, Fe, Co, Ni, Cu, Zn, Al, In, Sn, Sb, Bi, La, Ce, Pr, Nd, Gd, Dy, Er and Yb;
   composition (2): an aqueous solution comprising containing-anion N which comprises having at least one element (n) selected from the group consisting of S, P, F and B, forming a hardly soluble salt when reacted with the cation M.

2. The process according to claim 1, wherein the metal element (m) contained in the composition (1) is Al.

3. The process according to claim 1, wherein the anion N contained in the composition (2) is at least one anion selected from the group consisting of $SO_4^{2-}$, $PO_4^{3-}$ and $F^-$.

4. The process according to claim 1, wherein the heating is carried out at from 250 to 700° C.

5. The process according to claim 1, wherein the molar ratio of the metal element (m) contained in the composition (1) is within a range of from 0.001 to 0.05 based on the total amount of the transition metal element contained in the lithium-containing composite oxide.

6. The process according to claim 1, wherein the molar ratio of the anion N contained in the composition (2) is within a range of from 0.001 to 0.05 based on the total amount of the transition metal element contained in the lithium-containing composite oxide.

7. A cathode for a lithium ion secondary battery, comprising:
   a cathode active material for a lithium ion secondary battery produced by the process as defined in claim 1; and
   a binder.

8. A lithium ion secondary battery comprising:
   the cathode as defined in claim 7;
   an anode; and
   a non-aqueous electrolyte.

9. The process according to claim 1, wherein the composition (1) further comprises a pH adjusting agent.

10. The process according to claim 1, wherein the composition (2) further comprises a pH adjusting agent.

11. The process according to claim 1, wherein the heating is carried out in an oxygen-containing atmosphere.

12. The process according to claim 1, wherein the heating is carried out at a temperature of from 350 to 600° C.

* * * * *